United States Patent [19]

Traub et al.

[11] Patent Number: 4,752,670
[45] Date of Patent: Jun. 21, 1988

[54] BOBBIN ASSEMBLY FOR A SOLDERING/DESOLDERING DEVICE USING AN ETCHED FOIL HEATER

[75] Inventors: Kevin Traub, Laurel; Giuseppe Canala, Cockeysville, both of Md.

[73] Assignee: Pace Incorporated, Laurel, Md.

[21] Appl. No.: 748,620

[22] Filed: Jun. 25, 1985

[51] Int. Cl.$^4$ ............ H05B 1/02; H05B 3/02; B23K 3/04; H01C 3/10
[52] U.S. Cl. .............. 219/238; 219/229; 219/230; 219/241; 219/243; 219/535; 219/542; 219/549; 228/19; 228/51; 338/292; 338/294
[58] Field of Search ............ 219/221, 227–230, 219/236–241, 243, 535, 549, 542; 228/19–20, 51–55, 57; 338/292–294

[56] References Cited

U.S. PATENT DOCUMENTS

| | | | |
|---|---|---|---|
| 1,098,437 | 6/1914 | Hadaway | 219/238 |
| 2,437,747 | 3/1948 | Kuhn et al. | 219/227 X |
| 2,592,426 | 4/1952 | Jeffrey | 219/238 |
| 3,569,665 | 3/1971 | Hager | 219/241 X |
| 3,654,427 | 4/1972 | Schoemwald | 219/241 |
| 4,035,613 | 7/1977 | Sagawa et al. | 219/238 X |
| 4,108,713 | 8/1978 | Weisz | 219/243 X |
| 4,439,667 | 3/1984 | Sylvia | 219/238 X |
| 4,571,482 | 2/1986 | Vogel | 219/237 |
| 4,602,144 | 7/1986 | Vogel | 219/241 X |

Primary Examiner—Anthony Bartis
Attorney, Agent, or Firm—Gerald J. Ferguson, Jr.

[57] ABSTRACT

A bobbin assembly for a soldering/desoldering device may be readily produced by utilization of a heater assembly comprising an electrically insulating tape having an etched foil heater in the form of serpentine comprising a plurality of coextensive side by side parallel leg portions bonded to one side thereof. The bobbin assembly is formed by wrapping the heater assembly about a cylindrical bobbin with the heater leg portions parallel to the bobbin axis so as to form a first insulating layer in contact with the bobbin, a layer comprising the heater in contact with the first layer and a second insulating layer in contact with the heater. A wire is then wound about the entire assembly, in a helical manner, to hold all elements in place. Additionally, a dissimilar metal lead may be spot welded to the bobbin to form a thermocouple junction used for sensing the bobbin assembly temperature.

12 Claims, 2 Drawing Sheets

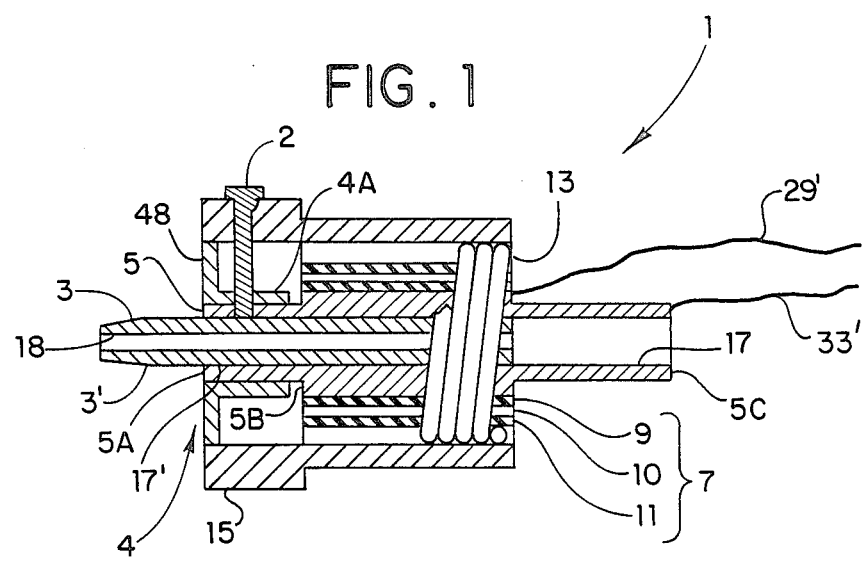
FIG. 1
PRIOR ART
FIG. 4
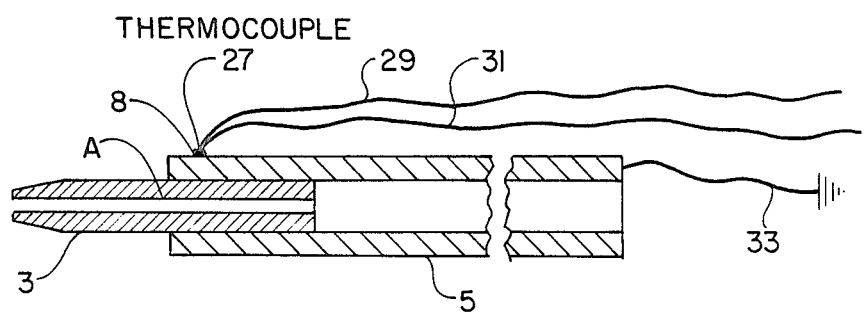
FIG. 5
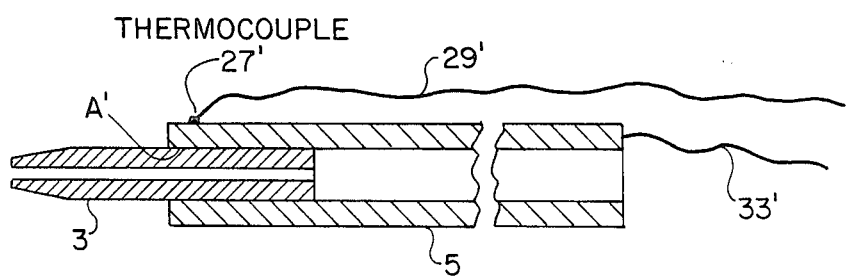

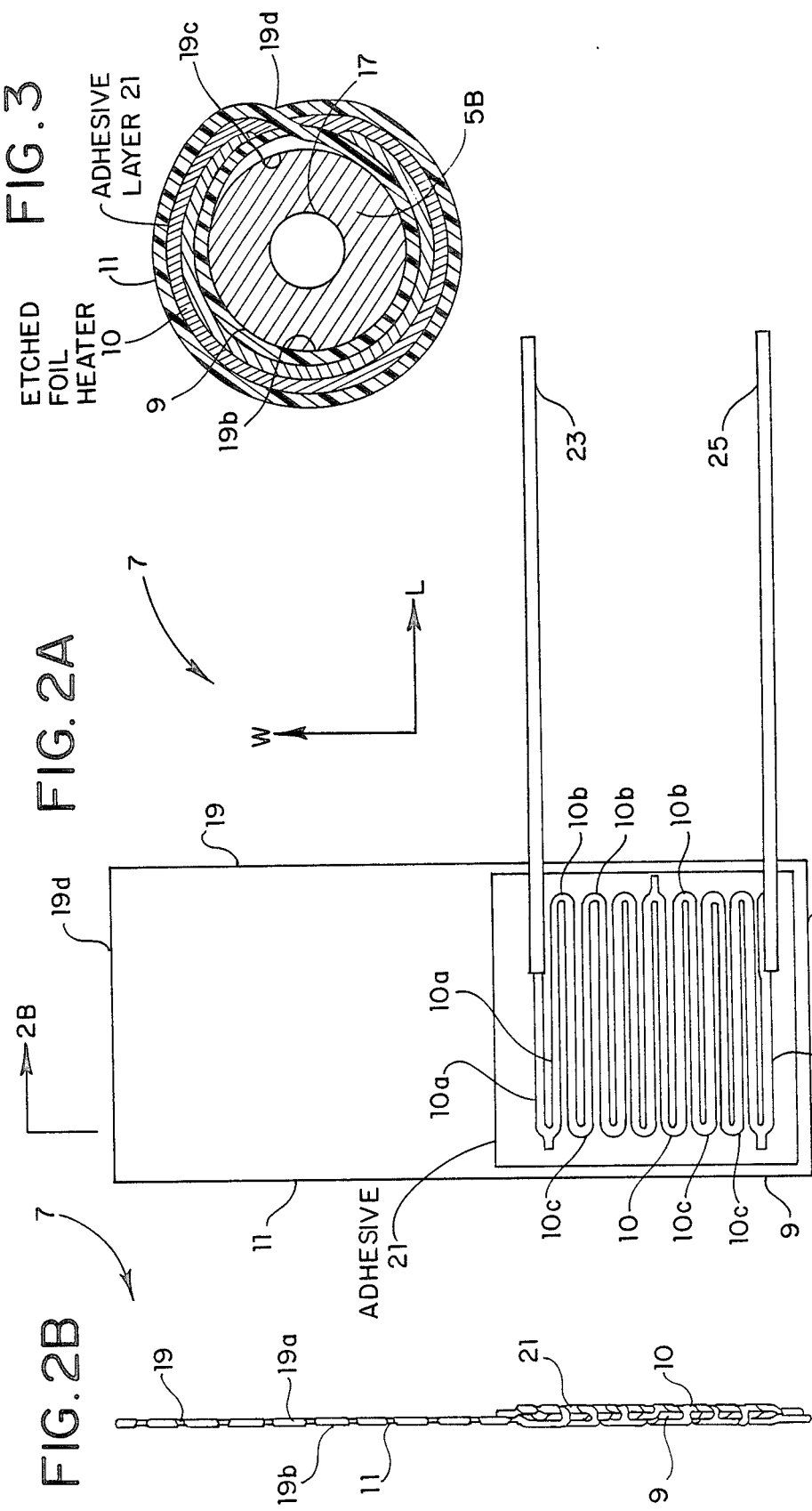

BOBBIN ASSEMBLY FOR A SOLDERING/DESOLDERING DEVICE USING AN ETCHED FOIL HEATER

BACKGROUND OF THE INVENTION

1. Field of the Invention:

The present invention is directed to the bobbin assembly for a soldering/desoldering device. More particularly, the present invention relates to an improved heater assembly and method of assembling the same.

2. Description of the Prior Art:

It is known in the art to utilize metal deposited foil heaters, which are axially disposed with respect to the soldering/desoldering device. In particular, such heaters are prepared by depositing (e.g., vapor depositing or sputtering) a metal heater element (by use of an appropriate mask) on a flexible ceramic (an unfired ceramic). This flexible ceramic is then wrapped about a ceramic bobbin so that the deposited metal foil heater is sandwiched between the ceramic bobbin and the flexible ceramic. This composite structure is then fired to cure the flexible ceramic. As will be appreciated, the heater cannot be separately tested when manufactured in this manner, since the "green" (unfired) ceramic upon which it is deposited is itself electrically conductive. Thus, the heater may only be tested after firing of the "green" ceramic, however, after firing, it is too late to take any corrective action and any faulty heater circuits must be discarded. Additionally, the ceramic bobbin has a thickness of about 0.125 inch, while the flexible ceramic, upon which the heater element is deposited and which is wrapped around the ceramic bobbin, has a thickness of 0.005–0.010 inch. Thus, the tendency in this type of heater construction is for excessive amounts of radiative heat dissipation since there is less resistance to the outward flow of heat from the assembled unit.

It is further known in the art to utilize a resistance wire wrapped around a bobbin as the heater element of a bobbin assembly for a soldering/desoldering device.

It is also known in the art to place a thermocouple in close proximity to the tip of a soldering/desoldering device so as to measure the temperature thereof (or an approximation of the tip temperature). This measured temperature is then used to control the electric power supply to the heater assembly to maintain a desired temperature of the tip. However, such indirect measurement of the tip temperature is hindered by the buildup of corrosion layers between the tip and the thermocouple, there corrosion layers retard heat transfer and thus produce inaccurate temperature readings.

SUMMARY OF THE INVENTION

It is an object of the present invention to provide bobbin assembly for a soldering/desoldering device which is easy to assemble.

It is another object of the present invention to provide a heater assembly which facilitates the ease of manufacture of the bobbin assembly.

It is a further object of the present invention to provide a thermocouple structure for the bobbin assembly of a soldering/desoldering device which produces more accurate temperature readings.

These objects of the invention and other objects which will beocme apparent hereinafter are achieved by the provision of a bobbin assembly for heating the tip of a soldering/desoldering device which includes a bobbin body having an axis and an etched metal foil heater disposed coaxially about the bobbin body for supplying heat to the bobbin body. The bobbin body includes a receiving means for receiving a soldering/desoldering tip in coaxially thermally conductive contact with the bobbin body.

In another embodiment, the present invention provides a bobbin assembly for heating the tip of a soldering/desoldering device which includes a metallic heater conductive bobbin body having an axis and a heater assembly having an axis coaxially disposed about the bobbin body for heating the bobbin body. The bobbin body includes receiving means for receiving a soldering/desoldering tip in coaxial thermally conductive contact with the bobbin body. The heater assembly includes a first electrically insulating layer disposed about and in contact with the metallic heat conductive bobbin body, a metal foil heater disposed about and in contact with the first electrically insulating layer, and a second electrically insulating layer disposed about and in contact with the metal foil heater.

In yet another embodiment, the present invention provides a bobbin assembly for heating the tip of a soldering/desoldering device which includes a heat conductive bobbin body having an axis, a heating assembly having an axis coaxially disposed about the bobbin body for heating the bobbin body, and clamping means having an axis coaxially disposed about the bobbin body for holding the heater assembly in thermally conductive contact with the bobbin body. The bobbin body includes holding meaans for holding a soldering/desoldering tip in coaxially thermally conductive contact with the bobbin body. The heater assembly includes a first electrically insulating layer disposed about and in contact with the bobbin body, a planar etched foil electric resistance heater substantially in the form of a serpentine, and a second electrically insulating layer disposed about and in contact with the heater. The planar etched foil electric resistance heater includes a plurality of substantially coextensive parallel leg portions disposed side by side, and a plurality of first and second U-shaped portions. Each leg portion includes two ends and is joined to the adjacent leg portion on one side by a respective first U-shaped portion at one end of the leg portion and joined to the adjacent leg portion on the other side by respective second U-shaped portion at the other end of the leg portion. The leg portions of the planer etched foil heater are parallel to the bobbin axis and disposed about and in contact with the first layer.

In a further embodiment, the present invention provides a foil heater assembly which includes an electrically insulating tape having a topside and a bottom side and a predetermined width. The foil heater assembly further includes a planar etched foil heater bonded to the top side of the tape which is substantially in the form of a serpentine. The heater includes a plurality of substantially coextensive parallel leg portions disposed side by side and a plurality of U-shaped portions. Each leg portion includes two ends, each of which is joined to the adjacent leg portion on one side by a respective first U-shaped portion at one end of the leg portion and joined to the adjacent leg portion on the other side by a respective second U-shaped portion at the other end of the leg portion. The heater has a width, measured across the leg portions, which is substantially equal to one-half of the tape width and a length, measured parallel to the leg portions which is substantially equal to the length of the tape. The heater is disposed adjacent to one lengthwise edge of the tape on the top side of the tape and has its length parallel to and coextensive width the length of the tape.

In a still further embodiment the present invention provides a method of making a bobbin assembly for heating the tip of a soldering/desoldering device which includes the step of providing a heat conductive bobbin body having an axis and including a main body portion having a predetermined circumference and a predetermined length. The method further includes the step of providing a planar etched foil electric resistance heater substantially in the form of a serpentine which includes a plurality of substantially coextensive parallel leg portions disposed side by side, and a plurality of U-shaped portions. Each leg portions has two ends, and is joined to the adjacent leg portion on one side by a respective first U-shaped portion at one end of the leg portion and joined to the adjacent leg portion on the other side by a respective second U-shaped portion at the other end of the leg portion. The etched foil heater has a width, measured across the leg portions, which is substantially equal to the circumference of the main portion of the bobbin body and a length, measured parallel to the leg portions, which is substantially equal to the length of the main portion of the bobbin body. The method further includes providing an electrically insulating tape having a top side and a bottom side and a length substantially equal to the length of the main portion of the bobbin body and a width substantially equal to twice the circumference of the main portion of the bobbin body. The method further includes the step of adhesively bonding the etched foil heater to the tape. The etched foil heater is disposed, adjacent one lengthwise edge of the tape on the top side of the tape so as to substantially divide the tape into two halves, a first half adjacent one lengthwise edge having the heater bonded thereto and a second half adjacent the other lengthwise edge. The length of the heater is parallel to and coextensive with the length of the tape. The method further includes the step of placing the bottom side of the first half of the tape in contact with the main portion of the bobbin body and wrapping the tape about the bobbin body with the bottom side facing the bobbin body to form a bobbin body having a multi-layer wrapping thereabout. The multi-layer wrapping includes a first insulating tape layer in contact with the main portion of the bobbin body, a heater layer and a second insulating tape layer in contact with the heater layer. This method further includes winding a wire in a helical manner about the main portion of the bobbin body having a multi-layer wrapping thereon to retain the wrapping in place.

BRIEF DESCRIPTION OF THE DRAWING FIGURES

FIG. 1 is a partially broken away section of a bobbin assembly according to the present invention.

FIG. 2A is a plan view of a heater assembly according to the present invention.

FIG. 2B is a sectional view of the heater assembly of FIG. 2A, taken along line X—X.

FIG. 3 is a sectional view of a heater assembly wrapped about a bobbin according to the present invention.

FIG. 4 is an illustration of a prior art thermocouple installation.

FIG. 5 is an illustration of the thermocouple installation according to the present invention.

DETAILED DESCRIPTION OF THE INVENTION

FIG. 1 illustrates a bobbin assembly, generally indicated at 1, for heating the tip 3 of a solder/desoldering device of which the bobbin forms a part (the remainder of the soldering/desoldering device being of conventional construction and therefore not illustrated). The bobbin assembly 1 comprises a heat conductive bobbin body 5, a heater assembly 7 comprising a first electrically insulating layer 9, an etched foil electric resistance heater 10, and a second electrically insulating layer 11; a wire 13 wrapped about the heater assembly 7 in a helical manner; and a thermally insulating sleeve 15.

The bobbin body 5 is of substantially cylindrical form and comprises a first end portion 5A, a main body portion 5B, and a second end portion 5C. The main body portion 5B is thicker than said end portions, 5A and 5C. Preferably, the bobbin body is made of metal so as to provide a high thermal conductivity for transferring heat from the heater 10 to the tip 3. Mostpreferably, the bobbin body is made of stainless steel so as to resist corrosion during long periods of use where it will be subjected to thermal strains such as repeated heating and cooling as well as being subjected to various corrosive fluxes and solders. Other metals can also be used, e.g, bronze and other copper alloys, as well as ceramics. The bobbin body 5 is provided with an axial bore 17 therethrough which is coaxially receivable of the tip 3. The outer surface 3' of the tip 3 is in thermally conductive contact with the inner surface 17' of the axial bore 17. The tip 3 may be held within the axial bore by set scerw 2 or by other means (not shown) such as force fitting, shims, wedges, etc. The tip 3 has a corresponding axial bore 18 therethrough and the axial bores 17 and 18 form a passageway for the removal of solder by application of vacuum pressures to bore 17, as is conventional in desoldering apparatus. Of course, the present invention is not limited to desoldering apparatus an a solid tip can be used for soldering applications. A spacer member 4 is disposed about the first end portion 5A of the bobbin body 5, intermediate the first end portion 5A and the insulating sleeve 15. The spacer member 4 has a cylindrical portion 4A disposed coaxially about and in contact with the first end portion 5A of the bobbin body 5. The end of the cylindrical portion 4A of the spacer member 4 which is adjacent the main portion 5B is spaced apart therefrom. The other end of the cylindrical portion 4A, which is remote from the main portion 5B of the bobbin body 5, has a flange portion 4B extending radially outward from the cylindrical portion 4A and abuttingly contacting the insulating sleeve 15. The spacer member 4 has a thermal conductivity less than that of the bobbin body 5 and, thus, acts as an insulator to aid in achieving maximum transfer of heat from the bobbin body 5 to the tip 3.

It will be appreciated that while the present embodiment illustrates a circular cross-section for the bobbin body and/or the tip, any cross-section can be utilized, e.g., triangular, square, hexagonal, semi-circular, etc., although circular is preferred.

The heater assembly 7 is coaxially disposed about the main portion 5B of the bobbin body 5 for heating the bobbin body. The heater assembly 7, as previously noted, comprises: a first electrically insulating layer 9 substantially in the form of a cylinder coaxially disposed about and in contact with the main portion 5B of bobbin body 5; an etched foil electric resistance heater 10 rolled into a substantially cylindrical shape coaxially disposed about and in contact with the first electrically insulating layer 9; and a second electrically insulating layer 11 substantially in the form of a cylinder coaxially disposed about and in contact with the etched foil electric resistance heater 10. In the preferred embodiment of the present invention, the first and second electrically insulating layers, 9 and 11, are actually integrally formed from a single strip of electrically insulating material. In particular, this single strip of electrically insulating material is utilized in the fabrication of a foil heater assembly 7 as best illustrated in FIGS. 2A and 2B. The foil heater assembly, generally indicated at 7, comprises an electrically insulating tape 19 having a top side 19a and a bottom side 19b and is of a predetermined length (extending in the direction of the arrow L in FIG. 2A) and of a predetermined width (extending in the direction of the arrow W in FIG. 2A). The heater assembly 7 further comprises: a planar etched foil heater 10 bonded to the top side 19a of the tape 19. The foil heater 10 is prepared by etching a thin foil of a suitable metal or alloy, e.g., Nichrome or preferably stainless steel, to form the desired shape. Of course, the foil heater may also be stamped from a thin foil of suitable metal or alloy. The heater 10 is formed in the shape of a serpentine comprising a plurality of substantially coextensive parallel leg portions 10a disposed side by side and a plurality of U-shaped portions, 10b and 10c. Each leg portion 10a has two ends and each leg portion is joined to the adjacent leg portion on one side by a respective first U-shaped portion 10b at one end of the leg portion and joined to the adjacent leg portion on the other side by a respective second U-shaped portion 10c at the other end of the leg portion. The etched foil heater 10 has a width, measured across the leg portions 10a, substantially equal to the circumference of the main portion of the bobbin body (and approximately one-half of the width of the strip of electrically insulating tape 19). The etched foil heater 10 has a length, measured parallel to the leg portions 10a, substantially equal to the length of the main portion of the bobbin (and approximately equal to the length of the strip of electrically insulating tape 19). The etched foil heater 10 is disposed adjacent one lengthwise edge 19c of said tape 19 on the top side 19a of the tape so as to substantially divide the tape 19 into two halves, 9 and 11, a first half 9 adjacent one lengthwise edge 19c having the heater 10 bonded thereto and a second half 11 adjacent the other lengthwise edge 19d.

The heater assembly 7 is incorporated into the bobbin assembly 1, as best seen in FIG. 3, by placing the bottom side 19b of the first half 9 of the tape 19 in contact with the main portion 5B of the bobbin body 5. The length of the tape 19 is coextensive with the length of the main portion of the bobbin body 5 and the tape 19 is wrapped widthwise about the circumference of the bobbin body with the bottom side 19b of the tape 19 facing the bobbin body 5 to form a bobbin body having a multi-layer wrapping thereabout. The multi-layer wrapping comprises a first insulating tape layer 9 (corresponding to the first half of the tape 19) in contact with the main portion of the bobbin body, a heater layer 10 in contact with the first layer 9 and a second insulating layer 11 (corresponding to the second half of the tape 19) disposed over the heater layer 10.

In a preferred embodiment, as shown in FIGS. 2A, 2B and 3, the heater 10 may be bonded to the tape 19 by an adhesive layer 21 disposed over the heater 10 and in contact with both heater 10 and tape 19. This adhesive layer 21 may be of the pressure sensitive type so that when the second half 11 of the tape 19 is wrapped thereover, it will retain the second half of the tape in place until the wire 13 is wrapped thereabout. In this regard, the adhesive layer need not be heat-resistant since it is sufficient if it exhibits its adhesive properties during assembly and after the wire 13 is wrapped about the heater assembly 7, the wire will serve to retain the heater assembly 7 in the desired configuration. Wire 13 serves as one possible type of clamping means to hold the heater assembly together in thermal conductive contact with the bobbin assembly 1. Further in this regard, the thicknesses of the tape 19, the heater 10 and the adhesive layer 21 have been exaggerated in the drawings for clarity of representation, however, in actuality the adhesive layer 21 could literally evaporate without leaving a substantial gap between the heater 10 and the second insulating layer 11.

Additionally, as shown in FIG. 2A, the heater 10 may have power leaders, e.g., Ni wires, 23 and 25, connected thereto, as by spot welding or any other suitable means, so as to connect the heater 10 with an electric power supply (not shown).

In a preferred embodiment, the tape 19 is a mica tape and the heater 10 is etched from stainless steel having a thickness of about 0.001 inch.

The present invention also utilizes a thermocouple in close proximity to the tip in order to measure the temperature of the tip and to use this measured temperature to control the power supplied to the heater as is conventional in the art. In this regard, no illustration of the conventional power supply and control circuitry is provided since these are well known in themselves.

However, as shown in FIG. 4, the prior art thermocouple system presents a number of problems. In particular, a thermocouple juncture 27 is formed, in conventional manner, by bonding a pair of dissimilar metal leads, 29 and 31, together and placing them then in contact with the bobbin body 5 (shown in simplified form) in close proximity to the tip 3. The bobbin body 5 is connected to ground by a ground wire 33, and the dissimilar leads 29 and 31 are connected to the power supply control circuitry. In this configuration, wherein the tip 3 temperature is approximated by the thermocouple juncture 27 placed in close proximity to the tip 3, the speed of heat transfer between tip 3 and bobbin body 5 and between bobbin body 5 and thermocouple juncture 27 will determine the accuracy of the temperature measurement, (i.e., the closeness of the approximation) since the thermal load on the tip 3 when it is brought into contact with an item to be soldered or desoldered must be transmitted back to the thermocouple juncture 27 before the control circuitry will take action in terms of controlling the power supplied to the heater. In this regard, it has been found that oxides tend to build up at the juncture B between the bobbin body 5 and the thermocouple juncture 27. These oxides inhibit heat transfer at the junctures A and B and thus adversely affect the accuracy of the tip temperature measurement.

It has now been found, as shown in FIG. 5, that these problems may be at least partially alleviated by utilizing the bobbin body 5 as one of the dissimilar leads for thermocouple formation and by forming a thermocouple juncture 27' by spot welding a dissimilar metal lead 29' to the bobbin body 5 in close proximity to the tip 3. In this case, ground wire 33' serves a dual function as the ground wire and as the second lead (along with lead 29' to the power supply control circuitry. Furthermore, in this case, oxides only build up at the junction A' between the tip 3 and the bobbin body 5 and therefore, the overall resistance to heat transfer between the tip 3 and the thermocouple juncture 27' is less than that of the prior art configuration as shown in FIG. 4. This lessened resistance to heat transfer allows the thermocouple juncture 27' to more rapidly detect tip temperature changes and thereby results in a more accurate temperature control. Although not shown in FIG. 5, it will be appreciated that lead wire 29' and thermocouple juncture 27' may lie between the bobbin body 5 and the first insulating layer 9, as shown in FIG. 1 or alternatively may exit outside the heater and insulating layers and the lead may be insulated with sleeving.

In operation, the foil heater of the present invention provides a better contact with the bobbin than the prior art devices utilizing a resistance wire wound about a bobbin, since th flat surface of the foil heater in heat conductive contact with the bobbin represents about ½ of the total surface area of the heater. In contrast, a wire wound about the bobbin only puts about 1/25 of its total surface area in heat conductive contact with the bobbin.

As previously noted, the prior art devices utilizing ceramic cores with metal heater elements deposited thereon do not permit testing of the heater circuit prior to the firing of the "green" ceramic and, thus, cause waste in that only irreversibly assembled articles can be tested. The foil heater of the present invention (whether etched or stamped), can be tested prior to assembly and thereby allows the discard of defective units at minimum cost.

Moreover, the prior art creamic based heaters are not well adapted to closed loop control (feedback control) and are generally run as an "open" system. In such an "open" system, power is supplied to the heating element and the bobbin assembly goes to its maximum idle (no load) temperature. When used, the heat load on the bobbin assembly cools the same, and, due to the high thermal mass of the bobbin assembly, re-heating requires some time. In this regard, the maximum idle temperature is about 950° C. and the minimum running (loaded) temperature is about 700° C. In contrast, the present invention, particularly by use of a metallic bobbin, allows rapid heat transfer from the heater element to the tip and therefore allows use of feedback control to maintain the tip temperature at a constant value (preferably, at the running temperature), with a concomitant power savings and lessened chance of overheating.

What is claimed is:

1. A bobbin assembly for heating the tip of a soldering/desoldering device comprising:
 a bobbin body having an axis, said bobbin body having a receiving means for receiving a soldering-/desoldering tip in coaxial thermally conductive contact with said bobbin body; and
 an etched metal foil heater disposed coaxially about said bobbin body for supplying heat to said bobbin body;
 said etched metal foil heater comprising a planar electric resistance heater in the form of a serpentine comprising a plurality of substantially coextensive parallel leg portions disposed side by side and a plurality of U-shaped portion, each leg portion having two ends, each leg portion joined to the adjacent leg portion on one side by a respective first U-shaped portion at one end of the leg portion and joined to the adjacent leg portion on the other side by a respective second U-shaped portion at the other end of the leg portion, said planar electric resistance heater rolled about said bobbin body with said leg portions parallel to said bobbin body axis.

2. A bobbin assembly for heating the tip of a soldering/desoldering device comprising:
 a metallic heat conductive bobbin body having an axis, said bobbin body having a receiving means for receiving a soldering/desoldering tip in coaxial thermally conductive contact with said bobbin body; and
 a heater assembly, having an axis, coaxially disposed about said bobbin body for heating said bobbin body, said heater assembly comprising a first electrically insulating layer disposed about and in contact with said metallic heat conductive bobbin body, a metal foil heater disposed about and in contact with said first electrically insulating layer, and a second electrically insulating layer disposed about and in contact with said first electrically insulating layer, and a second electrically insulating layer disposed about and in contact with said metal foil heater;
 said metal foil heater being a planar etched metal foil heater substantially in the form of a serpentine comprising a plurality of substantially coextensive parallel leg portions disposed side by side and a plurality of U-shaped portions, each leg portion having two ends, each leg portion joined to the adjacent leg portion on one side by a respective first U-shaped portion at one end of the leg portion and joined to the adjacent leg portion on the other side by a respective second U-shaped portion at the other end of the leg portion, said planar electric resistance heater rolled about said bobbin body with said leg portions parallel to said bobbin body axis.

3. The bobbin assembly as claimed in claim 2, further comprising thermocouple means for measuring the temperature of the bobbin body proximate the soldering-/desoldering tip, said thermocouple means comprising a first electrically conductive wire wleded to said bobbin body proximate the soldering/desoldering tip and a second electrically conductive wire electrically connected to said bobbin body at a location remote from said first wire, said weld of said first wire to said bobbin body forming a thermocouple junction.

4. A bobbin assembly for heating the tip of a soldering/desoldering device comprising:
 a heat conductive bobbinbody having an axis, said bobbin body having a holding means for holding a soldering/desoldering tip in coaxial thermally conductive contact with said bobbin body;
 a heater assembly, having an axis, coaxially disposed about said bobbin body for heating said bobbin body;
 clamping means, having an axis, coaxially disposed about said bobbin body for holding said heater assembly in thermally conductive contact with said bobbin body;
 wherein said heater assembly comprises:
 a first electrically insulating layer disposed about and in contact with said bobbin body, a planar etched foil electric resistance heater substantially in the form of a serpentine comprising a plurality of substantially coextensive parallel leg portions disposed side by side and a plurality of first and second portions, each leg portion having two ends, each leg portion joined to the adjacent leg portion on one side by a respective first U-shaped portion at one end of the leg portion and joined to the adjacent leg portion on the other side by a respective second U-shaped portion at the other end of the leg portion, said planar etched foil heater having said leg portions parallel to said bobbin axis and disposed about and in contact with said first layer, and a second electrically insulating layer disposed about and in contact with said heater.

5. The bobbin assembly as claimed in claim 4, further comprising a thermally insulating sleeve, having an axis, disposed about and in contact with said clamping means.

6. The bobbin assembly as claimed in claim 4, wherein said holding means comprises an axial bore through said bobbin body, said axial bore coaxially receivably engageable of a soldering/desoldering tip for heat transfer from said bobbin body to the tip and releasable locking means for locking the tip in thermally conductive contact with said bobbin body.

7. The bobbin assembly as claimed in claim 6, wherein said releasable locking means comprises a set screw passing through and threadingly engaging an aperture in said bobbin body, said aperture disposed transverse to and intersecting said axial bore.

8. The bobbin assembly as claimed in claim 4, wherein said clamping means comprises a wire helically wound about said bobbin body.

9. The bobbin assembly as claimed in claim 4, wherein said bobbin is metal.

10. The bobbin assembly as claimed in claim 4, wherein said bobbin body comprises a substantially cylindrical member having a first end portion, a second end portion, and a main body portion intermediate said first and second end portions, said main body portion being thicker than said first or second end portions.

11. The bobbin assembly as claimed in claim 10, wherein said heater assembly is coaxially disposed about said main body portion.

12. The bobbin assembly as claimed in claim 11, further comprising a thermally insulating sleeve, having an axis, disposed about and in contact with said clamping means; and a spacer member, intermediate said first end portion of said bobbin body and said insulating sleeve, said spacer member comprising a cylindrical portion, having an axis, disposed coaxially about and in contact with said first end portion of said bobbin body, said cylindrical portion having a first end adjacent said main body portion and a second end remote from said main body portion, said first end spaced apart from said main body portion, and a flange portion proximate said second end, said flange portion extending radially outward from said cylindrical portion and abuttingly contacting said insulating sleeve, said spacer member having a heat conductivity less than said bobbin body.

* * * * *